United States Patent [19]
Lovitt

[11] Patent Number: 6,123,239
[45] Date of Patent: Sep. 26, 2000

[54] ADJUSTABLE ATTACHMENT SYSTEM FOR A MOTORCYCLE BAG

[76] Inventor: Terry Lovitt, 4050 W. Chandler Ave., Santa Ana, Calif. 92704

[21] Appl. No.: 09/306,124

[22] Filed: May 6, 1999

[51] Int. Cl.[7] .................................................... B62J 11/00
[52] U.S. Cl. .................... 224/413; 224/153; 224/275; 224/645; 224/652; 224/585; 190/103; D12/416
[58] Field of Search .................................... 224/584, 585, 224/153, 651, 250, 275, 413, 427, 428, 429, 430, 436, 437, 439, 463, 572, 645, 652; 190/103; D12/416

[56] References Cited

U.S. PATENT DOCUMENTS

| | | |
|---|---|---|
| D. 249,036 | 8/1978 | Ramalia et al. . |
| D. 308,916 | 7/1990 | Dinham . |
| 2,105,319 | 1/1938 | Hedden et al. ................... 224/153 X |
| 3,813,018 | 5/1974 | Heltzen . |
| 4,003,508 | 1/1977 | Hoops . |
| 4,059,207 | 11/1977 | Jackson et al. . |
| 4,066,196 | 1/1978 | Jackson et al. . |
| 4,442,960 | 4/1984 | Vetter . |
| 4,580,706 | 4/1986 | Jackson et al. . |
| 4,643,343 | 2/1987 | Goldman et al. . |
| 4,752,263 | 6/1988 | Prtichard et al. ................... 224/153 X |
| 4,809,891 | 3/1989 | Patrin . |
| 5,405,068 | 4/1995 | Lovett . |
| 5,647,522 | 7/1997 | Routh ..................................... 224/651 |
| 5,660,310 | 8/1997 | LeGrow ................................. 224/275 |
| 5,676,296 | 10/1997 | Masters .............................. 224/651 X |
| 5,738,262 | 4/1998 | Andrini . |
| 5,743,452 | 4/1998 | Liu . |
| 5,803,332 | 9/1998 | Thompson ............................. 224/651 |
| 5,826,771 | 10/1998 | Pend ...................................... 224/651 |

*Primary Examiner*—Gregory M. Vidovich
*Attorney, Agent, or Firm*—Price, Gess & Ubell

[57] ABSTRACT

A travel bag for a motorcycle is disclosed that can be easily attached and removed from a variety of different size motorcycle seat backs or sissy bars and ensures that the bag is secure during motorcycle operation. The bag carries a series of vertically aligned straps on the exterior surface of the bag that faces the front of the motorcycle. Each strap is adjustable in length to fit a variety of seat back widths. The height of the seat back or sissy bar determines how many straps are used. The straps are located on the bag so that the bottom of the bag may rest on the luggage rack when the bag is appropriately affixed to the seat back. Additional straps fasten the bag down to the luggage rack or the seat back itself, to prevent the bag from being lifted off at high speeds.

6 Claims, 3 Drawing Sheets

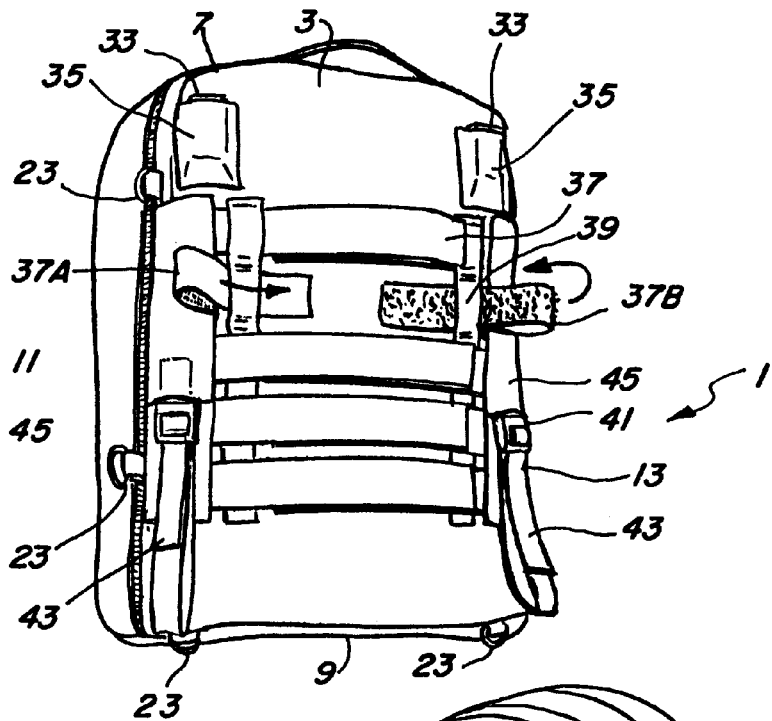

ADJUSTABLE ATTACHMENT SYSTEM FOR A MOTORCYCLE BAG

BACKGROUND OF THE INVENTION

1. Field of the Invention

This invention relates to a luggage container for use with motorcycles, and more specifically, a bag that can be removably attached to a backrest of a motorcycle.

2. Description of Related Art

A number of different bag designs have been developed to cope with the problems associated with attaching it to a seat back or sissy bar of a motorcycle. U.S. Pat. No. 4,003,508 to Hoops discloses the use of a sleeve and straps on the front surface of a bag to fasten it to a sissy bar. The structure discussed in Hoops does not adequately grip the sissy bar, thus allowing the bag to pivot or windmill around the sissy bar. Other fastening means, as shown in U.S. Pat. No. Des. 249,036 to Ramalia, et. al., and U.S. Pat. No. Des. 253,269 to Ramalia, et. al., have faced similar disadvantages when used to fasten the bag to a sissy bar.

U.S. Pat. No. 3,813,018 (Heltzen) teaches yet another way of attaching a collapsible luggage pouch to a passenger seat back. U.S. Pat. No. Des. 308,916 (Dinham) shows a bag that is attached to a motorcycle by a pouch that fits over the seat back. These types of fastening systems also suffer from inadequate attachment that cause the bag to flap, vibrate or even come loose and fall off when the motorcycle is traveling at high speeds. By strapping a large collapsible luggage bag to the passenger seat of a motorcycle and clamping its bottom to the luggage rack, U.S. Pat. No. 4,125,213 to Watkins teaches yet another way of fastening a bag to a motorcycle.

None of the prior art schemes of attaching a bag to a motorcycle provide for height and width adjustment of the fastening mechanism to accommodate different size seat back or sissy bars while still providing a secure attachment at high speeds.

SUMMARY OF THE INVENTION

The present invention provides a travel bag for a motorcycle that is easily attached and removed from a variety of different size motorcycle seat backs or sissy bars and ensures that the bag is secure during motorcycle operation. The bag carries a series of vertically aligned straps on the exterior surface of the bag that faces the front of the motorcycle. Each strap is adjustable in length to fit a variety of seat back widths. The height of the seat back or sissy bar determines how many straps are used. The straps are located on the bag so that the bottom of the bag may rest on the luggage rack when the bag is appropriately affixed to the seat back. Additional straps fasten the bag down to the luggage rack or the seat back itself, to prevent the bag from being lifted off at high speeds.

BRIEF DESCRIPTION OF THE DRAWINGS

The exact nature of this invention as well as its features and advantages will be readily apparent by referring to the following detailed description when considered in conjunction with the accompanying drawings in which like reference numerals designate like parts throughout the figures and wherein;

FIG. 2 is a front plane elevational view of a motorcycle bag showing the adjustable straps of the present invention;

FIG. 3 is top perspective view showing the motorcycle bag with backpack straps;

DETAILED DESCRIPTION OF THE PREFERRED EMBODIMENTS

The following description is provided to enable any person skilled in the art to make and use the invention and sets forth the best modes, contemplated by the inventor, for carrying out his invention. Various modifications, however, will remain readily apparent to those skilled in the art, since the generic principles of the present invention have been defined herein specifically to provide a readily and easily manufacturable adjustable motorcycle bag.

Figure 1:
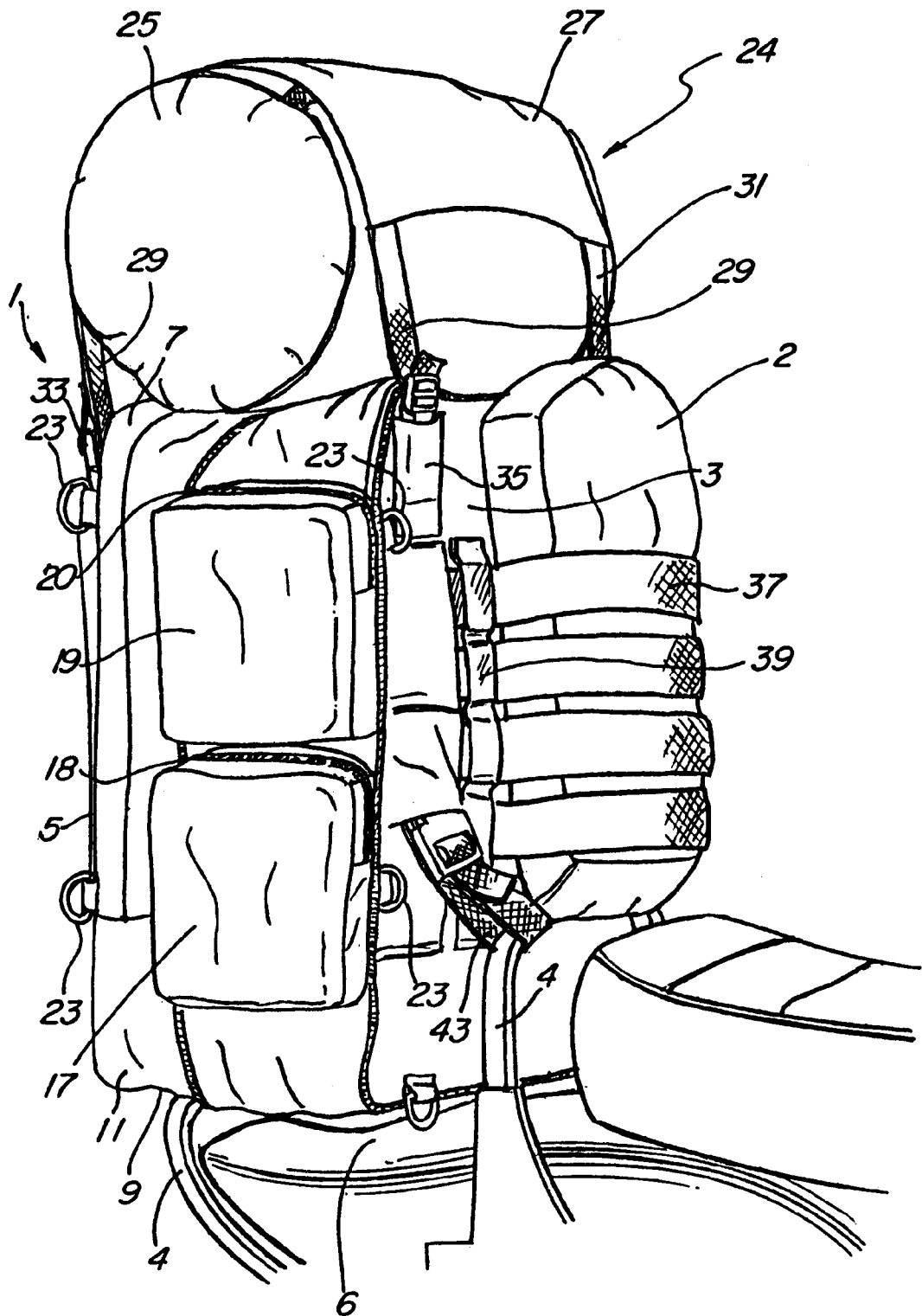
FIG. 1 is a perspective view of a motorcycle bag, mounted to the backrest of a motorcycle rear seat using a preferred embodiment of the present invention.

FIG. 1 shows a bag 1 having a front surface 3, a rear surface 5, a top surface 7, a bottom surface 9 and a pair of side surfaces 11 and 13 (FIG. 2). The bag 1 is constructed from a durable, water resistant fabric preferably a heavyweight nylon with considerable dimensional stability, such as, "CORDURA PLUS." It is contemplated that the bag 1 may be equipped with internal rainliners to further ensure that the contents of the bag 1 remain dry during adverse conditions.

The bag 1 includes a pair of side pockets 17 and 19 on one side surface 11 and may include an additional pair of pockets on the other side surface 13 in order to increase storage capacity. Access to the side pockets 17 and 19 is provided by the zippers 18 and 20, respectively.

A series of connecting loops 23 are affixed to the bag 1. As described below in connection with FIG. 3, the loops 23 function to connect a pair of backpack straps 47 (FIG. 3) to the bag 1. The unused loops 23 may facilitate attaching additional articles to the bag 1 to further increase its carrying capacity.

An additional feature of the bag 1 is a hold down tarp 24 for a bed roll 25 that affixes to the top surface 7 of the bag 1. In the preferred embodiment, the tarp 24 includes a fabric web 27 that connects to a pair of straps 29 and 31 which attach to a series of side release buckles or quick disconnects 33. The side release buckles 33, located at each of the upper corners of the bag 1, facilitate the easy release and removal of the bed roll 25. If the tarp 24 is not in use, a set of sheaths 35 hold one of the respective ends of the buckles 33 in order to prevent the buckles 33 from moving during the operation of the motorcycle. By limiting the movement of the buckles 33, the sheaths 35 provide the tarp 24 with a series of stable connecting points in which to secure the bed roll 25.

FIG. 2 shows the front surface 3 of the bag 1 with a gusset 63 (FIG. 4) closed by a zipper 67. A series of straps 37 and loops 39 are attached to the front surface 3. In the preferred embodiment, a series of five strap pairs 37 are arranged vertically, one on top of the other. Each of the strap pairs 37 have a strap fastened on one end of the left side and a strap fastened on the one end of the right side. The strap pair 37 includes a segment 37A and a segment 37B that are constructed of a heavyweight nylon fabric, such as, "CORDURA PLUS" and have an adjustable attachment mechanism, such as, Velcro (hook and loop fastener) snaps, hooks or other suitable means. Due to the variety of motorcycle seat widths and heights, adjustability is preferably achieved through the loops 39 that limit the length of each strap pair 37. The loops 39 are preferably a vertical strip of material sewn to the left and right sides of bag front 3 with spacing between the sewn sections that permit a strap to pass under. Passing the strap pair 37 under the loops 39 shortens its length, adapting it for use with narrow seat backs or sissy bars. Passing the strap pair 37 over the loop 39 lengthens the loop pair 39, adapting it for use with wider seat backs or sissy bars.

The strap pairs 37 are constructed so that the bottom surface 9 of the bag 1 rests on a luggage rack 4 or a fender member 6 (FIG. 1) when the strap pairs 37 are attached to a seat back 2. While the strap pairs 37 attach the bag 1 to the motorcycle, the weight of the bag 1 is borne by the luggage rack 4 or the fender 6. The weight of the bag 1 on the luggage rack 4 inhibits the bag 1 from shifting positions when the motorcycle is moving.

Although the strap pairs 37 primarily attach the bag 1 to the backrest 2 with forces in a horizontal direction, added security is provided by a pair of straps 43 that affix the bag 1 to the base of the backrest 2, the luggage rack 4 (FIG. 1) or other available attachment point by implementing forces in a vertical direction. The straps 43 are attached to a pair of quick disconnects 41 and are secured by a pair of sheaths 45.

FIG. 3 shows the motorcycle bag 1 with a pair of straps 47 that facilitate carrying bag 1 as a backpack when it is detached from the motorcycle. The straps 47 become accessible by opening a zippered pocket 49 on the front surface 3. The straps 47 each have an adjustment member 51 and a clip-on 53 for attaching the straps 47 to a pair of loops 23 (FIG. 2). The clip-ons 53 are preferably metal clips that attach to the loops 23 that are located at the base of the front surface 3 (FIG. 2). A handle 61 is attached to the top surface 7 of the bag 1 to permit for another way of carrying the bag 1 when it is not connected to the motorcycle. It is contemplated that a single strap or other strap configurations may be used as a shoulder strap to carry the bag 1.

Figure 4:
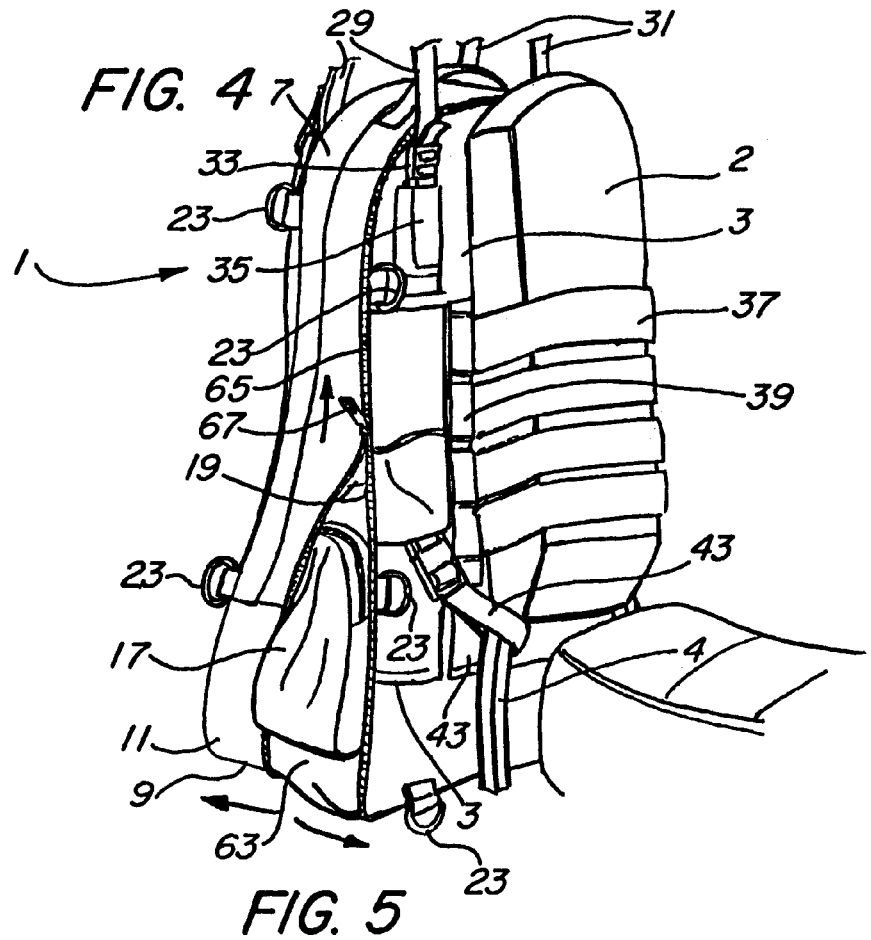
FIG. 4 is a perspective view of an alternative embodiment of the motorcycle bag, with a zippered gusset providing for the expansion of the bag.

FIG. 4 shows an additional feature of the bag 1 wherein the zippered gusset 63 provides for its expansion. The gusset 63 extends entirely around an edge 65 of the front surface 3 of the bag 1. The pockets 17 and 19 are attached to the gusset 63 to provide additional storage space. It is contemplated that the bag 1 may implement a gusset located on edges of either the front surface 3 or the rear surface 5. When the extra storage space is not needed, the gusset 63 or gussets are closed by the zipper 67.

If a passenger is not being carried, the bag 1 may be mounted in a reversed orientation so that the front surface 3 faces the rear of the motorcycle. The straps 37 attach to the seat back 2 and the bottom surface 9 of the bag 1 is supported by the passenger's motorcycle seat. The position of the bag 1 enables the rider to use the bag 1 as a backrest. If the rider desires additional storage capacity, it is contemplated that a second bag may be affixed to the other side of the seat back 2 and/or the bag 1 by straps or other suitable means.

Figure 5:
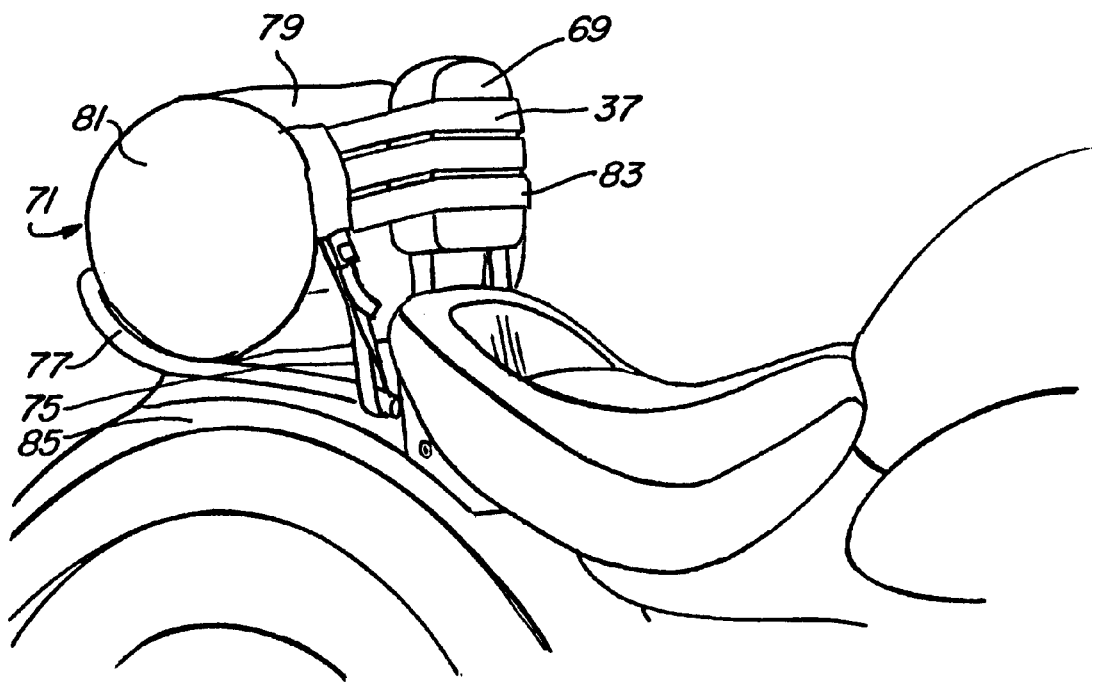
FIG. 5 shows a perspective of another alternative embodiment of the motorcycle bag.

FIG. 5 shows an alternate embodiment of the invention fitted to a different size seat back that is shorter. More particularly, a motorcycle bag 71 is attached to a motorcycle seat back 69. The bag 71 is a cylindrical shaped container with a curved surface 79 and a pair of side surfaces 81 and 83 (not shown). A series of straps 37 hold the bag 71 to the seat back 69. The straps 37, including at least two pairs of straps, are mounted to the outside of surface 79 of the bag 71. It is contemplated that a zipper would provide access to the inside of the bag 71.

A pair of additional straps 75 are provided to further attach the bag 71 to the base of the backrest 2, the luggage rack 77 or other available attachment points by implementing forces in a vertical direction. In order to avoid excessive weight on the straps 37, the majority of the weight of bag 71 is borne by the luggage rack 77 or a fender 85. The weight of the bag 71 on the luggage rack 77, coupled with straps 37 and additional straps 75, minimizes the bag 71 from shifting positions when the motorcycle is moving.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A bag attachable to a variety of different sizes of motorcycle seat backs that vary in width and length by an attachment system permanently fastened to the bag, said attachment system comprising:

a plurality of pairs of straps aligned vertically on one side of the bag, each strap having a first end and a second end, the first end of each strap permanently fastened to the bag;

a fastening mechanism on the second end of each strap for fastening the second ends of each strap pair together over a seat back; and a pair of loops for each strap pair, each loop having spaced end portions in connection with the bag on the same side as the pairs of straps at a preferred distance from the first end of each strap to selectively permit each strap to pass within an area defined by the loop or over the loop, passing a strap within the area defined by the loop the loop effectively fastens the strap to the bag at the loop, thereby adjusting the bag fastened end of each strap for a narrower seat back.

2. The bag of claim 1, further comprising:

a zippered enclosure having a bottom attached to a respective end of a front, back and two sides, the front and back connected together by the two sides.

3. The bag of claim 2, further comprising:

a pair of hold down straps, one on each side of the zippered enclosure having a fastening mechanism for attaching the bag to the frame of the motorcycle with a downward force.

4. The bag of claim 3, further comprising a gusset which extends around the side of the bag and is opened and closed by a zipper, the gusset providing for expansion of the bag.

5. The bag of claim 4, further comprising shoulder straps and means for securing the shoulder straps to the bag.

6. The bag of claim 1, said fastening mechanism comprising a plurality of hook and loop cloth fastening mechanisms attached to the second ends of each pair of straps.

* * * * *

UNITED STATES PATENT AND TRADEMARK OFFICE
CERTIFICATE OF CORRECTION

PATENT NO. : 6,123,239
DATED : September 26, 2000
INVENTOR(S) : Terry E. Lovett

It is certified that error appears in the above-identified patent and that said Letters Patent is hereby corrected as shown below:

Title page:

[76] Inventor: Delete Terry Lovitt and insert -- Terry E. Lovett --.

Signed and Sealed this

First Day of May, 2001

Attest:

NICHOLAS P. GODICI

Attesting Officer     *Acting Director of the United States Patent and Trademark Office*